(12) United States Patent
Chen et al.

(10) Patent No.: US 6,276,123 B1
(45) Date of Patent: Aug. 21, 2001

(54) TWO STAGE EXPANSION AND SINGLE STAGE COMBUSTION POWER PLANT

(75) Inventors: Allen G. Chen, Orlando; Douglas Edward Hintz, Winter Springs; Michael James Lenick, Oviedo; Mohammed A. Wajid Siddiqui, Winter Springs, all of FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/667,415

(22) Filed: Sep. 21, 2000

(51) Int. Cl.[7] .................................. F02C 6/16; F02C 7/26
(52) U.S. Cl. ................................. 60/39.141; 60/39.183; 60/727
(58) Field of Search ......................... 60/39.141, 39.183, 60/39.511, 39.75, 727

(56) References Cited

U.S. PATENT DOCUMENTS

| | | |
|---|---|---|
| 3,631,673 * | 1/1972 | Charrier et al. .................. 60/39.183 |
| 3,866,058 * | 2/1975 | Lenssen ................................. 60/727 |
| 4,347,706 | 9/1982 | Drost . |
| 4,523,432 | 6/1985 | Frutschi . |
| 4,630,436 * | 12/1986 | Frutschi ............................. 60/39.183 |
| 4,870,816 | 10/1989 | Nakhamkin . |
| 4,885,912 | 12/1989 | Nakhamkin . |
| 4,936,098 | 6/1990 | Nakhamkin . |
| 5,363,642 * | 11/1994 | Frutschi et al. ........................ 60/727 |
| 5,448,889 | 9/1995 | Bronicki . |
| 5,537,822 | 7/1996 | Shnaid et al. . |
| 5,778,675 | 7/1998 | Nakhamkin . |

* cited by examiner

Primary Examiner—Louis J. Casaregola

(57) ABSTRACT

A two stage expansion and single stage combustor compressed air energy storage cycle that employs a heat exchanger to raise the temperature of the compressed air before it enters a high pressure expander. A combustor heats the exhaust from the high pressure expander and creates a working gas to drive a low pressure expander. The exhaust from the low pressure expander is supplied to the heat exchanger to raise the temperature of the compressed incoming air. A portion of the exhaust of the high pressure expander is cooled and employed in a cooling circuit within the low pressure expander. A starter valve in the compressed air input circuit finely tunes the incoming air during startup. The startup air flow is heated by an auxiliary duct burner until the low pressure turbine exhaust reaches operating temperature and is sufficient to heat the incoming air under normal operating conditions.

15 Claims, 4 Drawing Sheets

TWO STAGE EXPANSION AND SINGLE STAGE COMBUSTION POWER PLANT

FIELD OF THE INVENTION

This invention relates generally to compressed air energy storage (CAES) turbomachinery cycle systems and more particularly to such systems that employ a recuperator to heat the incoming compressed air with heat recovered from the turbine exhaust.

BACKGROUND OF THE INVENTION

CAES power plants have become effective contributors to a utilities generation mix as a source of peaking or intermediate energy and spinning reserve. CAES plants store off-peak energy from relatively inexpensive energy sources such as coal and nuclear base load plants by compressing air into storage devices such as underground caverns or reservoirs. Underground storage can be developed in hard rock, bedded salt, salt dome or acquifer media.

Following off-peak storage, the air is subsequently withdrawn from storage, heated, combined with fuel and combusted and expanded through expanders, i.e., turbines, to provide needed peak/intermediate power. Since inexpensive off-peak energy is used to compress the air, the need for premium fuels, such as natural gas and imported oil, is reduced by as much as about two-thirds compared with conventional gas turbines.

Compressors and turbines in CAES plants are each connected to a synchronous electrical machine such as a generator/motor device through respective clutches, permitting operation either solely of the compressors or solely of the turbines during the appropriate selected time periods. During off-peak periods (i.e., nights and weekends), the compressor train is driven through its clutch by the generator/motor. In this scheme the generator/motor functions as a motor, drawing power from a power grid. The compressed air is then cooled and delivered to underground storage.

During peak/intermediate periods, with the turbine clutch engaged, air is withdrawn from storage and then heated and expanded through a turbine to provide power to drive the generator/motor. In this scheme, the generator/motor functions as a generator, providing power to a power grid. To improve the CAES efficiency, waste heat from a low pressure turbine exhaust is used to preheat high pressure turbine inlet air in a recuperator. The compression process in a CAES plant is characterized by a much higher overall compression ratio than traditionally experienced in conventional gas turbines. This requires multistage compression with intercoolers in order to improve CAES plant efficiency.

The turbomachinery associated with a convention CAES plant has high pressure and low pressure turbines with high pressure and low pressure combustors, respectively. Fuel is mixed with compressed air and combusted at essentially constant pressure in these combustors, thus producing mixtures of products of combustion with high temperatures. The high temperature mixtures are then expanded in series through the high pressure and low pressure turbines, thereby performing work. Each turbine generally has an optimum expansion ratio (i.e., ratio of turbine input pressure to turbine output pressure) resulting in the highest possible efficiency for a specific turbine inlet temperature. The efficiency and optimum pressure ratio increase with increasing turbine inlet temperatures.

Turbine trains used in CAES systems have an overall expansion ratio which is the product of expansion ratios of the individual turbines which are serially connected. The overall expansion ratio of a turbine train comprising high and low pressure turbines is the ratio of turbine train input pressure (to a high pressure turbine) to turbine train output pressure (exhaust from a low pressure turbine), and generally ranges for CAES applications from 20 to a 100 or more.

Due to generally high air storage pressures, CAES plants are subject to high operating pressures unless the intake compressed air is throttled to a lower pressure. As pointed out in U.S. Pat. No. 4,885,912 issued Dec. 12, 1989, throttling the pressure from 60 bar and above, that may be encountered in high pressure turbines of CAES systems, is inefficient due to the energy of stored pressure in the compressed air that is lost. As the patent recognizes, one solution is to develop high pressure combustors which are yet unproven. A second solution proposed by the patent is to eliminate the high pressure combustor and transmit the heated compressed air from the recuperator directly to the high pressure turbine. While this latter proposal is efficient under operating conditions it does create some instabilities and under startup conditions it creates some inefficiencies.

Furthermore, to further improve the efficiency of the process it is desirable to run the low pressure turbine as hot as its materials will permit. Increasing the heat of the working gas in the low pressure turbine not only increases the efficiency of the low pressure turbine cycle but also increases the temperature of the exhaust gas and, through the heat recovered in the recuperator, the temperature of the compressed air entering the high pressure turbine, thus improving the efficiency of the high pressure turbine as well.

Accordingly, it is an object of this invention to improve the startup conditions of the CAES system that does not employ a high pressure combustor. Additionally, it is a further object of this invention to improve the efficiency of the CAES system by enabling the low pressure turbine to handle a higher temperature working gas.

SUMMARY OF THE INVENTION

A two-stage expansion and single stage combustor compressed air energy storage cycle is disclosed that employs a heat exchanger to raise the temperature of the compressed air before it enters a high pressure expander. A portion of the exhausted air from the high pressure expander is cooled and redirected to cool a number of the turbine components. The remaining air exhausted from the high pressure expander is directed through a combustor where it is combined with fuel and burned to produce a hot gas which drives a low pressure turbine, the second stage of the expansion cycle. The exhaust from the low pressure turbine is fed back through the heat exchanger where a portion of its heat is transferred to the incoming compressed air. A startup arrangement and method is also described that uses a duct burner to heat the incoming compressed air until the low turbine exhaust temperature reaches operating conditions.

BRIEF DESCRIPTION OF THE DRAWINGS

These and other objects, features and advantages of the invention will become more readily apparent with reference to the following description of the invention in which.

DESCRIPTION OF THE PREFERRED EMBODIMENT

Figure 1:
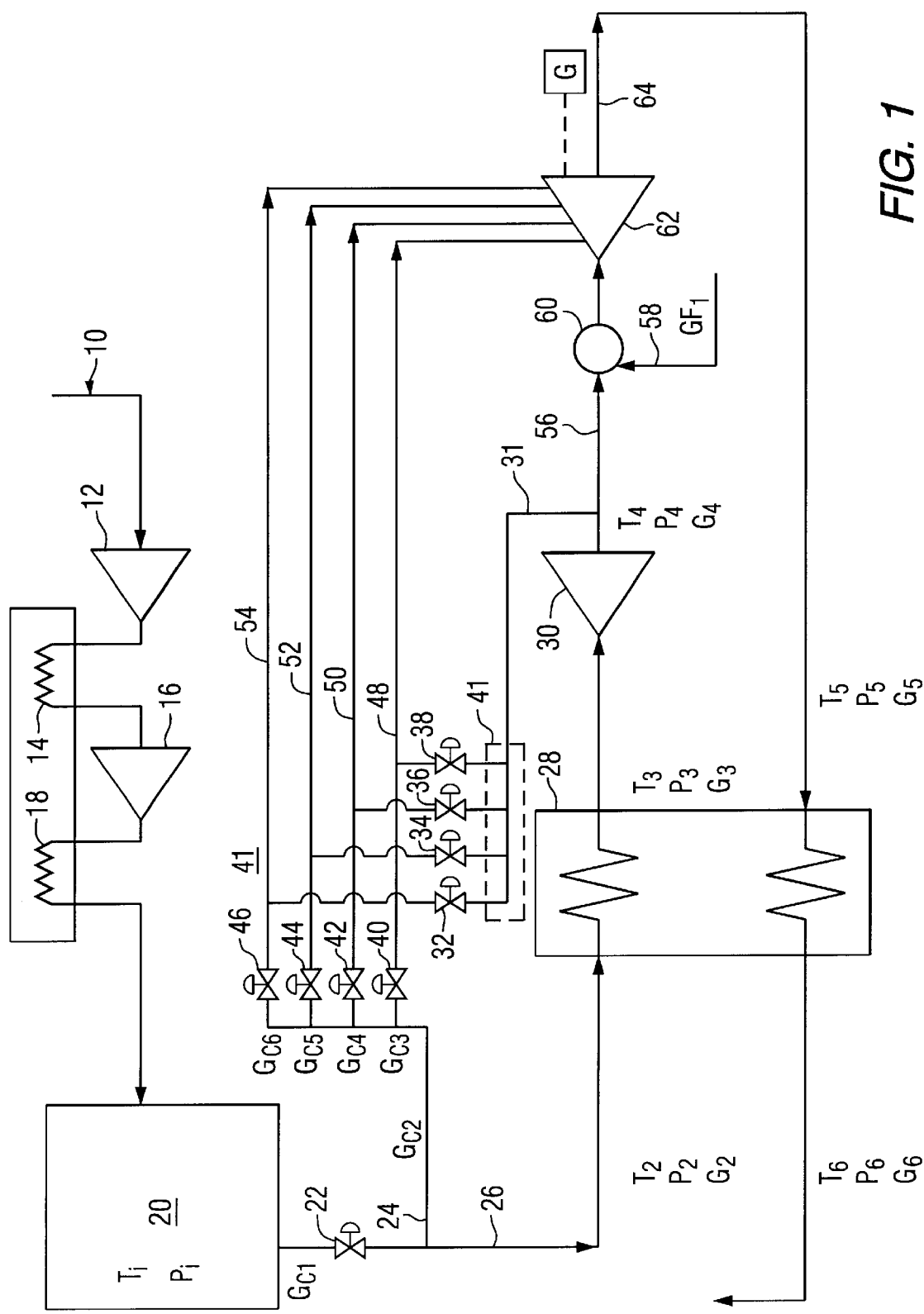
FIG. 1 is a schematic illustration of a compressed air energy cycle employing the components of this invention including a first embodiment for extracting a portion of the compressed air to cool the low pressure turbine components.
Figure 2:
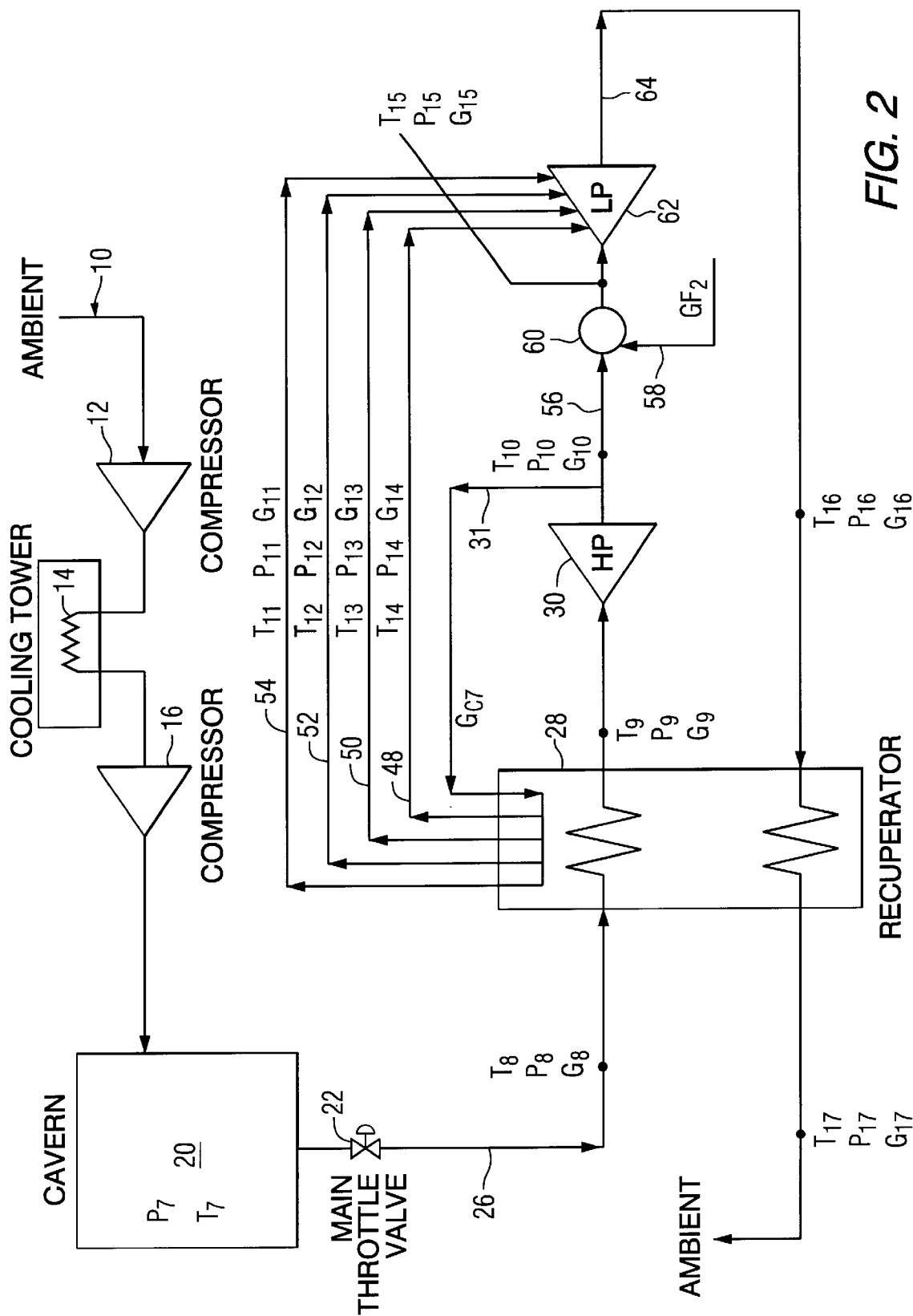
FIG. 2 is a schematic illustration of a compressed air energy storage cycle employing the components of this invention including a second embodiment for extracting a portion of the compressed air to cool the low pressure turbine components.
Figure 3:
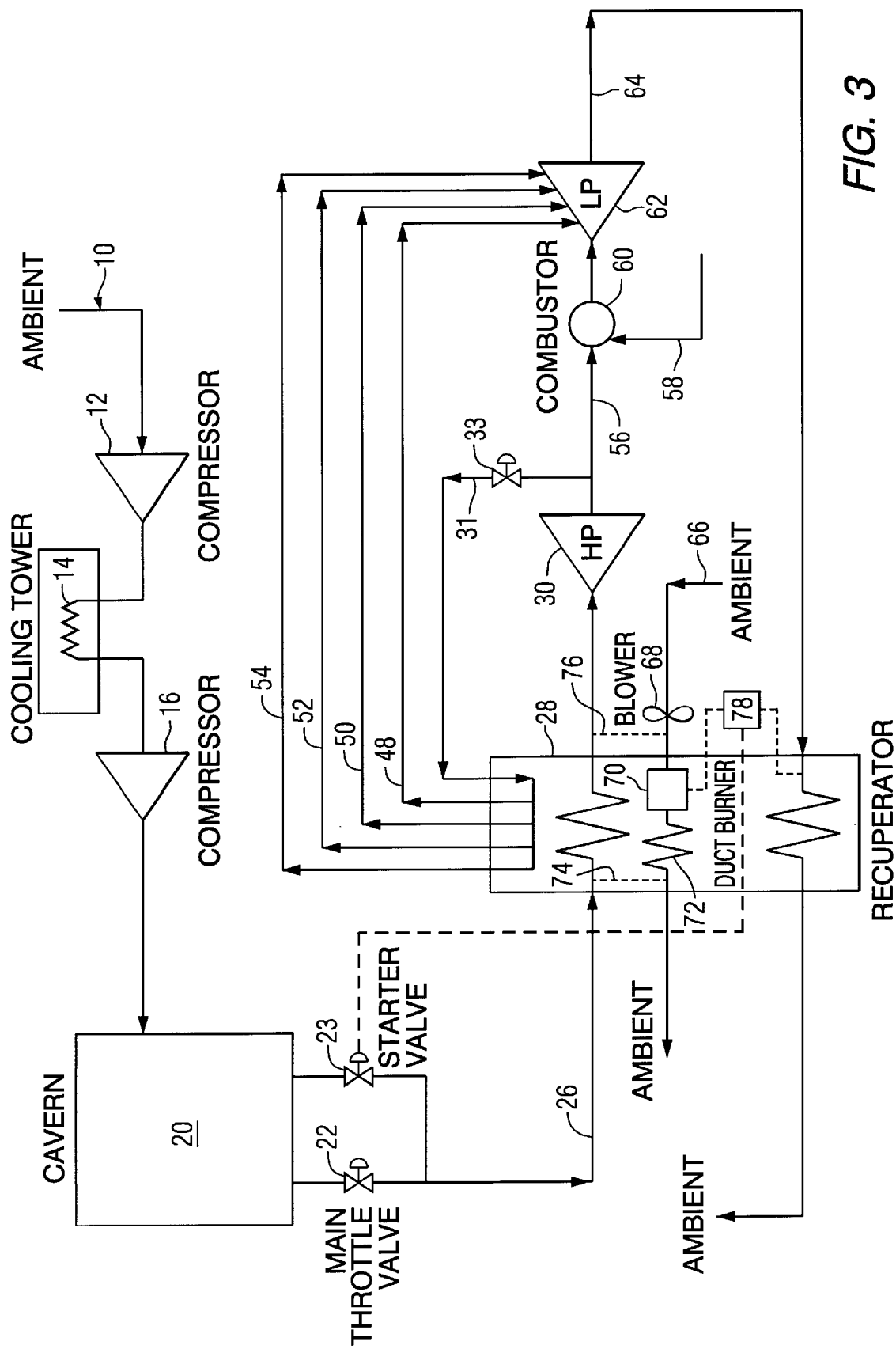
FIG. 3 is a schematic illustration of the compressed air energy cycle illustrated in FIG. 2 further including a starter valve and duct burner to enhance startup conditions.

A recuperated compressed air energy storage (CAES) cycle using a single stage combustor and two stage expansion for power generation constructed in accordance with this invention is illustrated in FIG. 1. The CAES system employs a large cavern 20 for storing high pressure air generated during a low power demand period. The high pressure air is then expanded to generate electricity during a high power demand period. During low demand periods, the turbine power not being employed to drive the generators, drives compressors 12 and 16 to compress the air to cavern specifications. Coolers 14 and 18 are disposed within the compressed air path respectively downstream of the compressors 12 and 16 to reduce the compressed air temperature to satisfy the requirements of the cavern 20 set by the cavern operator. FIG. 1 shows a double cooling circuit 14 and 18 in series with the compressed air flow path, while FIG. 2 shows a single cooling circuit 14. The extent of cooling required will be dictated by the cavern specifications. The cooling required can be achieved through the use of one or more cooling towers containing the cooling circuits. During high power demand periods the high pressure air from the cavern 20 can then be expanded through a turbine to generate electricity. The air released from the cavern is cool and at a high pressure. This cool and high pressure air presents difficulties for starting and sustaining combustion in a combustion turbine system. The current invention overcomes these difficulties by using a recuperator 28 instead of a high pressure combustor to warm the cold air before it is conveyed to the high pressure expander or turbine 30. The recuperator 28 can also be provided with a duct burner 70, as illustrated in FIG. 3 and described hereafter, for ease of starting.

FIG. 1 shows a recuperated CAES cycle at a base load condition for a typical power generation application. At low power demand, the compressor system 12 and 16 pumps the ambient air 10 into a large cavern 20. At peak power demand periods, a main throttle valve 22 can be opened to convey the stored compressed air in the cavern 20 to a recuperator 28. The main throttle valve 22 is designed to reduce the pressure and temperature of the air from the cavern to an optimal condition before entering the recuperator 28. The air is heated in the recuperator (heat exchanger) 28 by the exhaust gas 64 from a low pressure expander 62. The compressed air then flows through a high pressure expander 30 to further reduce the air temperature and pressure, and in the process, generate mechanical power. The power developed from the high pressure expander 30 runs on the same shaft as the low pressure expander or combustion turbine 62 to drive an electric power generator figuratively illustrated in FIG. 1 by the block labeled "G".

The air 56 exiting the high pressure expander 30 flows into a low pressure combustor 60. Part of the air 31 exiting the high pressure expander 30 is bled into a mixing manifold 41 through proportioning valves 32, 34, 36 and 38 that are respectively coupled with mixing valves 46, 44, 42 and 40, which tap into the air 24 being diverted downstream of the main throttle valve 22 coming from the cavern 20. The air 24 from the cavern is then proportioned through each of the valves 40, 42, 44 and 46 to obtain the desired flow rate along with the corresponding component of air 31 diverted downstream of the high pressure turbine 30 through proportioning valves 38, 36, 34 and 32. In this way the air 24 from the cavern 20 is used to cool the air 31 diverted from the high pressure turbine 30 in such proportions to give the desired temperature, pressure and flow rate to cool various components of the low pressure turbine 62 through the cooling conduits 48, 50, 52 and 54. The pressure and flow rate of the cooling air for each of the respective turbine components has to be sufficient to assure that the cooling air is expelled into the working gas for power augmentation.

The air 56 that flows into the low pressure combustor 60 is mixed with fuel 58 to generate a high temperature working gas. The working gas from the combustor 60 then enters the low pressure expander 62 to develop mechanical power for driving the electrical generator "G". The hot gas 64 exiting the low pressure expander 62 then flows into the recuperator 28 and is placed in heat exchange relationship with the incoming air 26 from the cavern 20. Some of the heat in the exhaust gas 64 is recovered in the recuperator and transferred to the cold air 26 from the cavern 20. The exhaust gas from the recuperator 28 then exits into the ambient air and thus completes the thermodynamic cycle.

FIG. 2 illustrates another embodiment of this invention in which the air 31 bled from the high pressure expander 30 exhaust is diverted back to the recuperator where it is placed in heat exchange relationship with the incoming air 26 from the cavern 20. Preferably, this third heat transfer circuit within the recuperator 28 is placed upstream of the incoming air 26 from the heat transfer circuit that places the low pressure turbine exhaust 64 in heat transfer relationship with the incoming air 26. It should be noted that like reference characters refer to corresponding elements in the several figures. The recuperator 28 is an energy (heat) exchange device and the variation in temperature in various parts of the recuperator is quite large, varying as much as 1,000° F., (537.8° C.). Therefore, the recuperator 28 can be used as a heat sink. The routing of the air 31 exhausted from the high pressure turbine 30 back to the recuperator 28 takes advantage of using the recuperator 28 as a heat sink rather than employing the more commonly used method illustrated in FIG. 1 to achieve the desired temperatures, pressures and flow rates, to cool the various components of the low pressure turbine 62. Though not shown, valves can be placed in each of the respective cooling lines 48, 50, 52 and 54 to proportion the cooling air 31 among the several cooling lines to achieve the desired parameters in the manner taught in FIG. 1. While FIG. 2 shows one cooling circuit within a cooling tower 14 intermediate of the intake compressors 12 and 16 as compared to the two cooling circuits 14 and 18 illustrated in FIG. 1, in all other respects, except as noted for the cooling circuit, the design of the CAES cycle illustrated in FIG. 2 is the same as FIG. 1. As previously mentioned, the pressure $P_7$ and temperature $T_7$ are dictated by the cavern specifications and will vary from application to application.

FIG. 3 illustrates a third embodiment of this invention, which is a modification of the design illustrated in FIG. 2, to enhance startup of the system. An atmospheric duct burner 70 fed by a blower 68 is placed in a heating circuit 72 in heat exchange relationship with the incoming air 26. A control system 78 can sense the temperature of the low pressure turbine 62 exhaust 64 entering the recuperator 28 and control the duct burner 70 so that the duct burner can gradually be reduced in temperature as more heat is transferred from the low pressure expander 62 exhaust 64. A starter valve 23 is also placed in parallel with the main throttle valve 22. Though not unique to this embodiment, FIG. 3 also shows a bleeder valve 33 that controls the amount of air 31 diverted from the exhaust of the high pressure expander 30. In all other respects, the system illustrated in FIG. 3 is identical to that illustrated in FIG. 2.

On startup of the system illustrated in FIG. 3 the duct burner 70 is ignited and the blower 68 is activated to drive ambient air 66 through the heating circuit 72 where it is exhausted on the other side of the recuperator 28 to the ambient atmosphere. Once the recuperator gets hot, the control system 78 can open the starter valve 23 in the cavern 20 outlet. The starter valve 23 has a much higher pressure ratio or pressure drop than the main throttle valve 22. The air from the starter valve 23 is at a lower flow rate, pressure, and temperature. This air flows into the recuperator 28 and is heated by the atmospheric burner 70. This warm air flows through the high pressure expander 30 to spin the shaft and into the low pressure combustor 60 to establish a favorable condition for the combustor 60 to ignite. Once the low pressure combustor 60 is ignited, the fuel flow 58 will be increased and bring the shaft speed to synchronize with the electrical power grid. The exhaust gas 64 from the low pressure expander 62 will heat up gradually to its operating temperature. At that point the duct burner 70 can be turned off. The main throttle valve 22 is gradually opened and the starter valve 23 can be closed. The loading procedure is initiated by increasing the air flow 26 from the cavern 20 and simultaneously increasing the fuel flow 58 into the low pressure combustor 60.

Bleeding of a portion of the air exhausted from the high pressure turbine 31 for cooling the low pressure turbine 62 components becomes increasingly important as turbine firing temperatures become higher to increase their efficiencies. The selection of temperatures and pressures of the air for cooling the turbine components also becomes an important consideration for optimum system performance. The temperatures T, pressures P, flow rate G and enthalpy H at various points in this system are illustrated in FIGS. 1 and 2 by their corresponding subscripts and exemplary values for those parameters can be found in the following Table 1.

TABLE 1

| PARAMETER | US | SI |
|---|---|---|
| $T_1$ | 87° F. | 30.56° C. |
| $P_1$ | 1500 psia | 10342 kPa |
| $T_2$ | −37° F. | −38.33° C. |
| $G_{c1}$ | 1008.7 lb/sec | 457.54 kg/sec |
| $G_{c2}$ | 38.19 lb/sec | 17.32 kg/sec |
| $G_{c3}$ | 27.89 lb/sec | 12.65 kg/sec |
| $G_{c4}$ | 5.26 lb/sec | 2.39 kg/sec |
| $G_{c5}$ | 2.77 lb/sec | 1.26 kg/sec |
| $G_{c6}$ | 2.77 lb/sec | 1.26 kg/sec |
| $P_2$ | 610 psia | 4206 Kpa |
| $G_2$ | 970.5 lb/sec | 440.21 kg/sec |
| $T_3$ | 1050° F. | 565.56° C. |
| $P_3$ | 602 psia | 4151 kPa |
| $G_3$ | 970.5 lb/sec | 440.21 kg/sec |
| $T_4$ | 742.8° F. | 394.89° C. |
| $P_4$ | 231.8 psia | 1598 kPa |
| $G_4$ | 893.1 lb/sec | 405.10 kg/sec |
| $G_{F1}$ | 21.9 lb/sec | 9.93 kg/sec |
| $T_5$ | 1104.5° F. | 595.83° C. |
| $P_5$ | 14.98 psia | 103 kPa |
| $G_5$ | 1030.6 lb/sec | 467.47 kg/sec |

TABLE 1-continued

| PARAMETER | US | SI |
|---|---|---|
| $T_6$ | 144° F. | 62.22° C. |
| $P_6$ | 14.7 psia | 101 kPa |
| $G_6$ | 1030.6 lb/sec | 467.47 kg/sec |
| $P_7$ | 1500 psia | 10342 kPa |
| $T_7$ | 200° F. | 93.33° C. |
| $T_8$ | 50° F. | 10° C. |
| $P_8$ | 610 psia | 4206 kPa |
| $G_8$ | 1008.7 lb/sec | 457.54 kg/sec |
| $T_9$ | 1050° F. | 565.56° C. |
| $P_9$ | 602 psia | 4150 kPa |
| $G_9$ | 1008.7 lb/sec | 457.54 kg/sec |
| $G_{c7}$ | 115.6 lb/sec | 52.44 kg/sec |
| $T_{10}$ | 742.8° F. | 394.89° C. |
| $P_{10}$ | 231.8 psia | 1598 kPa |
| $G_{10}$ | 893.1 lb/sec | 405.1 kg/sec |
| $G_{F2}$ | 21.9 lb/sec | 9.930 kg/sec |
| $T_{11}$ | 360.6° F. | 182.56° C. |
| $P_{11}$ | 66.3 psia | 457 kPa |
| $G_{11}$ | 4.55 lb/sec | 2.064 kg/sec |
| $T_{12}$ | 531.8° F. | 277.67° C. |
| $P_{12}$ | 144.3 psia | 995 kPa |
| $G_{12}$ | 9.96 lb/sec | 4.52 kg/sec |
| $T_{13}$ | 643.8° F. | 339.89° C. |
| $P_{13}$ | 179.6 psia | 1238 kPa |
| $G_{13}$ | 40.2 lb/sec | 18.23 keg/sec |
| $T_{14}$ | 391.8° F. | 199.89° C. |
| $P_{14}$ | 219.5 psia | 1513 kPa |
| $G_{14}$ | 60.92 lb/sec | 27.63 kg/sec |
| $T_{15}$ | 2575.7° F. | 1413.17° C. |
| $P_{15}$ | 223.0 psia | 1537 kPa |
| $G_{15}$ | 915.0 lb/sec | 415.04 kg/sec |
| $T_{16}$ | 1104.5° F. | 595.83° C. |
| $P_{16}$ | 14.98 psia | 103 kPa |
| $G_{16}$ | 1030.6 lb/sec | 467.47 kg/sec |
| $T_{17}$ | 200° F. | 93.33° C. |
| $P_{17}$ | 14.7 psia | 101 kPa |
| $G_{17}$ | 1030.6 lb/sec | 467.47 kg/sec |

Figure 4:
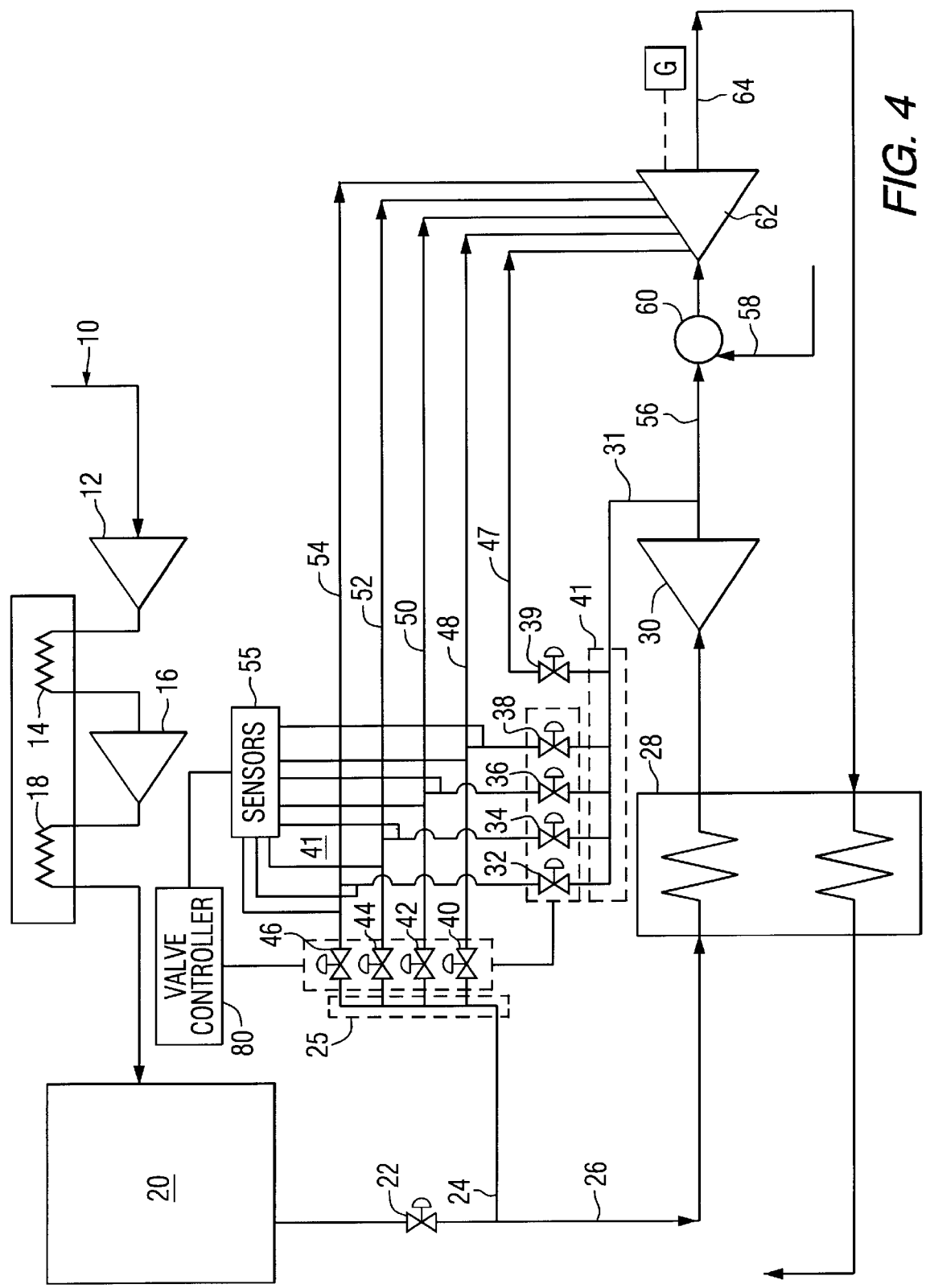
FIG. 4 is a schematic illustration of a compressed air energy cycle employing the components of this invention illustrated in FIG. 1 further including a fifth high pressure turbine air extraction line for cooling the first stage of the low pressure turbine.

FIG. 4 illustrates another embodiment of this invention, which is a variant of the embodiment illustrated in FIG. 1. Cold incoming pressurized air from the cavern 20, at approximately 600 psia (4137 kPa), is extracted out of the main line 26 supplying cold air to the recuperator 28 and eventually to the high pressure expander 30. The extracted air 24 is taken to a header 25 and distributed into four streams 48, 50, 52 and 54. The four streams 48, 50, 52 and 54 are respectively provided with control valves 40, 42, 44 and 46 and instrumentation 55 to measure the temperature, pressure and flow of the cold air. Three of the streams 48, 50 and 52 provide air that will be mixed with the hot air 31 bled from the air 56 exiting the high pressure expander 30 to provide cooling air for the nozzles of the $2^{nd}$, $3^{nd}$ and $4^{th}$ stages of the low pressure expander 62. The fourth stream 54 provides air that mixes with the hot air to provide for the rotor air cooling of the low pressure expander 62.

The air exiting the recuperator is run through the high pressure expander 30 and directed to the combustor 60 for heating and expanding in the low pressure expander 62, as described with respect to the embodiment of FIG. 1. In the embodiment shown in FIG. 4, the portion of the air 31 bled from the high pressure expander 30 is taken to a header and distributed into five streams. Each stream is provided with a corresponding proportioning control valve 32I, 34, 36, 38 and 39 and instrumentation 55 to measure the temperature, flow and pressure of the hot air.

The four streams of cold air from the mixing valves 40, 42, 44 and 46 are mixed with the four steams of the hot air from the proportioning valves 32, 34, 36 and 38 in proportions to meet the flow and temperature requirements of the cooling air. The valve control system 80 is set in such a way that the proportioning control valves 32, 34, 36 and 38 on the hot air 31 bled from the high pressure expander exhaust stream 56 provides the flow to meet the flow requirements as dictated by the low pressure expander cooling flow requirements and the control mixing valves 40, 42, 44, and 46 on the cold air streams provide air for meeting the temperature requirements as dictated by the low pressure expander cooling temperature requirements, or vice versa depending on the temperature of the cold air coming in from the cavern 20. The $5^{th}$ hot air stream 47 controlled by proportioning valve 39 provides cooling air directly to the $1^{st}$ stage nozzle of the low pressure expander 62.

In addition, it is to be understood that the invention can be carried out by different equipment and devices and that various modifications, both as to equipment details and operating procedures and parameters can be effected without departing from the scope of the claimed invention. For example, the duct burner 70 can be incorporated directly into the conduit through which the air 26 passes through the recuperator 28 as figuratively shown by reference characters 74 and 76 in FIG. 3, obviating the need for the blower 68. This arrangement would work equally well provided the flow rate does not extinguish the burner flame.

What is claimed is:

1. A compressed air energy storage cycle power generation system comprising:
    a heat exchanger having a primary and secondary side for heating compressed air introduced into the secondary side of the heat exchanger;
    a first turbine expander connected to an outlet on the secondary side of the heat exchanger for expanding compressed air heated in the heat exchanger through the turbine to create rotation of a first turbine shaft;
    a combustor having a compressed air intake communicably coupled to an exhaust on the first turbine for communicating air expanded through the first turbine and exiting the first turbine exhaust to the combustor, and a fuel inlet for mixing fuel with the expanded air and igniting the air fuel mixture in a combustion chamber within the combustor to create a working gas which is exhausted through a combustor outlet;
    a second turbine expander having a number of stationary and rotating components including an intake for receiving the working gas and expanding the working gas through the second turbine to create rotation of a second turbine shaft;
    a conduit coupled at one end to an exhaust on the second turbine through which the working gas exits and at the other end to the primary side of the heat exchanger to place the exhausted working gas in heat exchange relationship with the secondary side of the heat exchanger to heat incoming compressed air;
    a bleed line having a first and second end, coupled at the first end to the exhaust on the first turbine;
    a cooler having an inlet and outlet, communicably coupled at the cooler inlet to the second end of the bleed line and operable to lower the temperature of a portion of the expanded air bled at the first turbine exhaust; and
    a cooling conduit connected to the outlet of the cooler at a first end and communicably coupled to a cooling circuit in the second turbine for directing the cooled expanded air to the cooling circuit in the second turbine for cooling a turbine component.

2. The power generation system of claim 1 wherein the cooler is a component of the heat exchanger and includes a third heat transfer circuit in heat transfer relationship with the secondary side for transferring heat from the expanded air bled at the turbine exhaust to incoming compressed air.

3. The power generation system of claim 2 wherein the third heat transfer circuit is placed in heat transfer relationship with the secondary side upstream of the heat transfer from the primary side of the heat exchanger.

4. The power generation system of claim 1 wherein the cooler has a compressed air inlet for receiving a portion of the compressed air directed to the secondary side of the heat exchanger, a mixing chamber for mixing the compressed air with the expanded air bled from the first turbine exhaust to lower the temperature of the expanded air entering the cooler from the bleed line.

5. The power generation system of claim 4 wherein the cooler includes a metering control to control the amount of compressed air mixed with the expanded air in the cooler to control the temperature of the air exiting the cooler to the cooling conduit to a predetermined temperature.

6. The power generation system of claim 1 wherein the cooler controls the air exhausted at the cooler outlet into the cooling conduit to exit the cooler at a predetermined pressure and temperature.

7. The power generation system of claim 6 wherein the cooler outlet has a plurality of exit channels, which communicate with a corresponding plurality of coolant channels in the cooling conduit, at least two of said cooler exit channels are individually operable to control the temperature and pressure of the air exhausted at the cooler, so that a first of said at least two exit channels can maintain the air flowing there through at different temperature and pressure than a second of said at least two exit channels.

8. The power generation system of claim 1 including an auxiliary heater in heat exchange relationship with the secondary side of the heat exchanger and operable at start up of the power generation system to heat compressed air in the secondary side.

9. The power generation system of claim 8 including control means for monitoring the temperature of the exhausted working gas from the second turbine and automatically turning off the auxiliary heater when the exhausted working gas is greater than a set temperature.

10. The power generation system of claim 8 wherein the auxiliary heater is a duct burner disposed in heat exchange relationship with the secondary side of the heat exchanger.

11. The power generation system of claim 1 wherein the first and second turbine shafts are connected.

12. The power generation system of claim 1 including a first valve communicably coupled to an intake on the secondary side of the heat exchanger for controlling the flow rate of compressed air through the intake to the secondary side.

13. The power generation system of claim 12 wherein the first valve is designed to control the flow rate of compressed air at volumes required during full speed operation, including a second valve connected in parallel with the first valve and designed to control the flow rate of compressed air at start up volumes required to bring the turbines from rest up to full speed operation, said second valve providing finer control than said first valve.

14. The power generation system of claim 1 including a valve interposed in the bleed line for controlling the volume of bled expanded air communicated to the cooler.

15. The power generation system of claim 1 wherein a portion of the expanded air bled from the first turbine exhaust bypasses the cooler and is directed by a second cooling conduit to cool a first stage nozzle of the second turbine expander.

* * * * *